United States Patent [19]

Beals

[11] Patent Number: 4,772,167
[45] Date of Patent: Sep. 20, 1988

[54] BLIND FASTENER WITH DEFORMABLE DRIVE NUT

[75] Inventor: Edward H. Beals, Long Beach, Calif.
[73] Assignee: Monogram Industries, Inc., Culver City, Calif.
[21] Appl. No.: 860,550
[22] Filed: May 7, 1986
[51] Int. Cl.[4] ............................................ F16B 13/04
[52] U.S. Cl. ...................................... 411/43; 411/55; 411/34
[58] Field of Search ...................... 411/34, 35, 36, 37, 411/38, 43, 45, 55, 70, 39

[56] References Cited

U.S. PATENT DOCUMENTS

| | | |
|---|---|---|
| 1,551,381 | 8/1925 | Foss . |
| 2,099,678 | 11/1937 | Curtis . |
| 2,282,711 | 5/1942 | Eklund . |
| 2,765,699 | 10/1956 | La Torre . |
| 2,915,934 | 12/1959 | La Torre . |
| 3,236,143 | 2/1966 | Wing . |
| 3,253,495 | 5/1966 | Orloff . |
| 3,276,308 | 10/1966 | Bergere . |
| 3,302,510 | 2/1967 | Gapp . |
| 3,493,254 | 2/1970 | Summerlin . |
| 3,643,544 | 2/1972 | Massa . |
| 3,653,294 | 4/1972 | Nason . |
| 3,657,956 | 4/1972 | Bradley et al. . |
| 4,012,984 | 3/1977 | Matuschek . |
| 4,089,247 | 5/1978 | Dahl et al. . |
| 4,370,081 | 1/1983 | Briles . |
| 4,376,604 | 3/1983 | Pratt et al. . |
| 4,499,647 | 2/1985 | Saramura et al. . |

FOREIGN PATENT DOCUMENTS

| | | |
|---|---|---|
| 3240539 | 11/1983 | Fed. Rep. of Germany . |
| 2104143 | 4/1972 | France . |
| 46-21128 | 3/1971 | Japan . |
| 598730 | 2/1948 | United Kingdom . |
| 259565 | 4/1970 | U.S.S.R. . |

OTHER PUBLICATIONS

Voi-Shan/Monogram Aerospace Fasteners Drawing #PLT-1040, 2 pages, Apr. 1974.
European Search Report dated 8/24/87 for Application No. 87106333.5 for Monogram Industries, Inc.

Primary Examiner—Neill Wilson
Attorney, Agent, or Firm—Pretty, Schroeder, Brueggemann & Clark

[57] ABSTRACT

A blind fastener of the type having a fastener body, a threaded stem and a sleeve is provided with a deformable drive nut in abutting contact with the fastener body to provide a positive mechanical engagement between the abutting surfaces of the two elements. The underside of the drive nut has an annular ridge made of a deformable material adapted to deform into indentations in the outer surface of the fastener body. The positive mechanical engagement between the two elements minimizes the build-up of tensile load applied to the stem during setting of the fastener.

6 Claims, 1 Drawing Sheet

BLIND FASTENER WITH DEFORMABLE DRIVE NUT

BACKGROUND OF THE INVENTION

This invention relates to drive nut blind fasteners for use in fastening two panels together in overlapped outer and inner relation.

Blind fasteners are used in a variety of applications in which access to the blind side surface of panels being connected together is extremely limited or in some cases not possible. For example, in the construction of aerodynamic designs, including aircraft and the like, a substantially flush surface usually is desired on the accessible side of the panels, while access to the blind side may not be possible. Application and use of such fasteners in the aerospace industry impose some of the most stringent requirements which the fasteners must meet or exceed. In particular, the fasteners must securely fasten the panels but resist losing their gripping power under the stresses and vibrations imposed upon them by the harsh environment in which they are used.

One type of blind fastener that satisfies these requirements comprises an internally threaded fastener body for insertion into aligned holes of the two panels, and an externally threaded cylindrical stem passing in threaded engagement through the fastener body. The inserted end of the stem has an enlarged stem head, and the outer end of the stem has a wrench engaging portion. Upon turning motion of the stem relative to the fastener body, the stem is moved in an axial outward direction through the fastener body. This axial outward movement causes a deformable sleeve around the stem and abutting against the stem head to deform around the fastener body to a fully set condition against the inner panel. The stem further may be provided with a localized weakened region or break groove adapted to shear the stem at a predetermined torque. The break groove preferably is located axially along the stem such that the stem twists off in substantially flush relation to the outer portion of the fastener body, i.e., the fastener body head, after the fastener is fully set. In actual practice, the stem twists off within a range between approximately one-eighth of an inch above or below the outer surface of the fastener body head. The fastener body head normally is received in a countersunk, flush relationship to the outer panel, thus providing an aerodynamic surface after the fastener is set. A protruding fastener body head also may be used to engage the outer panel.

When using blind fasteners for securing panels together, as described above, a drive nut threaded on the outer portion of the stem may be provided for abutting contact with the fastener body head and gripping by an installation tool to hold it and the fastener body against rotation. When setting the fastener, slippage of the drive nut on the fastener body head occurs during rotation of the stem. With the relatively smooth surfaces of the drive nut and the fastener body head abutting, they tend to overtighten and jam together. As a result, relative turning slippage between them in a tightening direction is accommodated by elastic extension of the stem in the region gripped between the drive nut and the fastener body. This extension tends to develop a tensile load in the stem which, when added to the torsional load already acting on the stem from rotating the stem in a tightening direction, can cause the stem to twist off before the fastener is completely set and, therefore, undesirably subtract from the effective clamping force exerted by the fastener on the panels.

The blind fastener disclosed in application Ser. No. 828,781 to Pratt provides friction enhancing means on at least one of the abutting surfaces of the drive nut and fastener body head to reduce over tightening and jamming between the two elements and, therefore, the build-up of tensile load in the stem. This friction enhancing means is disclosed as a coating of high frictional resistance, or knurling of the surface. It does not, however, provide a positive mechanical engagement between the drive nut and the fastener body head.

SUMMARY OF THE INVENTION

The present invention comprises a blind fastener having an internally threaded fastener body, an externally threaded stem, a deformable sleeve, a drive nut and deformable means for providing positive mechanical engagement between the drive nut and the fastener body. Upon rotation of the stem to set the fastener, a deformable surface on the drive nut deforms during initial slippage against an irregular surface provided in the outer surface of the fastener body head to create a positive mechanical engagement between the drive nut and fastener body, thereby resisting overtightening and jamming, and preventing the build-up of unacceptably high tensile load in the stem. The blind fastener of this invention furthermore is intended to be simple to install, reliable in use, and relatively inexpensive to manufacture.

In one embodiment of the invention, the deformable means comprises indentations in the outer surface of the fastener body head, and a substantially annular ridge formed on the underside of the drive nut for deforming into the indentations and providing positive mechanical engagement between the drive nut and the fastener body. In another embodiment, the deformable surface on the drive nut is formed by a countersunk bore on the conically shaped underside of the drive nut to provide a relatively sharp contacting surface, resembling a hollow frustum, generally triangular in cross-section. During initial setting of the fastener, the deformable surface has minimum contact with the fastener body head and deformation is at its least. As setting of the fastener continues, deformation of the deformable surface generally increases.

The positive mechanical engagement between the drive nut and the fastener body head created by the deformable means helps prevent overtightening and jamming of the drive nut against the fastener body head. This minimizes the build-up of tensile load in the stem in the region gripped between the drive nut and fastener body head. As a result, the stem is not subjected to unacceptable tensile loads that could cause it to twist off prematurely before the fastener is fully set.

The method of fastening panels using the fastener of this invention comprises the steps of inserting the fastener through the aligned openings in the panels until the fastener body head engages an outer surface of the outer panel, with the sleeve positioned beyond the inner surface of the inner panel. An installation tool is applied to grip the drive nut and hold it against rotation, while applying torque to the outer region of the stem to turn it in one direction until the sleeve has been bulged laterally to a fully set condition in overlying contact with the inner surface of the inner panel. The method further includes deforming the deformable surface on the underside of the drive nut against the irregular surface on the outer surface of the fastener body head to provide the positive engagement between the drive nut and the fastener body head during turning motion of the stem to set the fastener, as described above. If desired, the manufacturer may pre-deform the deformable surface on the drive nut against the irregular surface on the fastener body head during assembly of the fastener.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
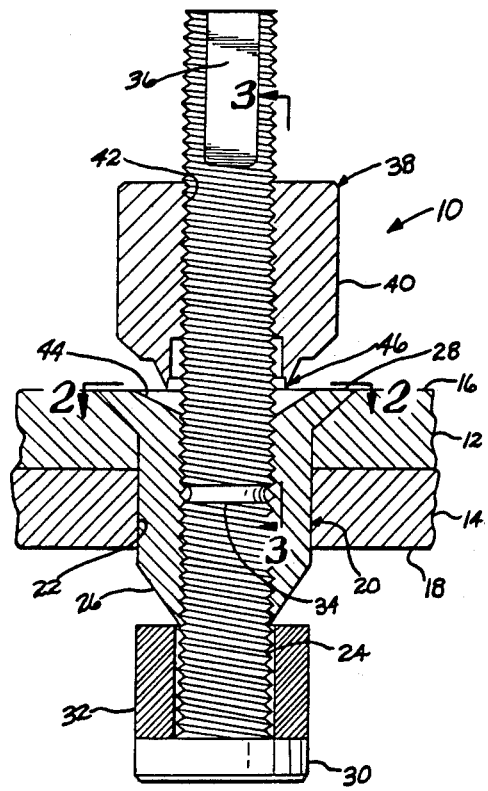
FIG. 1 is a longitudinal cross-sectional view of a blind fastener with a drive nut and fastener body embodying the novel features of the present invention, showing the assembled fastener inserted in two panels prior to setting of the fastener.

As shown in the exemplary drawings, the present invention is embodied in a blind fastener, generally referred to by the reference numeral 10, for use in connecting two panels together in overlapped outer and inner relation. The fastener is provided with deformable means for providing positive mechanical engagement between the drive nut and a fastener body to resist overtightening and jamming between the two elements during setting of the fastener. The blind fastener of the present invention furthermore is intended to be simple to install, reliable in use and relatively inexpensive to manufacture.

Referring to FIG. 1, the blind fastener 10 of the present invention is shown in position for connecting two panels 12 and 14 together in overlapped outer and inner relation, with the outer panel 12 having an accessible outer surface 16 and the inner panel 14 having an inaccessible or blind inner surface 18. The fastener comprises an internally threaded, generally tubular fastener body 20 received within aligned openings 22 in the two panels, and an externally threaded cylindrical stem 24 passing in threaded engagement through the fastener body. The fastener body has a tapered nose 26 projecting inwardly beyond the inner surface of the inner panel, and an enlarged body head 28 received in a substantially flush, countersunk relationship to the outer surface of the outer panel. Enlarged body heads of the non-flush, protruding head type also may be used. The stem has an enlarged head 30 at its inserted or inner end for abutment with a substantially cylindrical, deformable sleeve 32. The outer dimensions of the fastener body, stem head and sleeve are substantially the same, but are slightly less than the diameters of the holes in the two panels. This sizing of the fastener permits insertion of the fastener through the holes in the two panels to enable the fastener to perform its clamping function on the blind side, as explained in more detail below. Alternatively, the fastener may be sized to provide an interference fit between the fastener and the aligned holes in the panels.

To set the fastener 10 and clamp the two panels 12 and 14 together, the stem 24 is turned in one direction relative to the fastener body 20. This turning motion causes the stem to move in an axial outward direction through the fastener body. As the stem is moved axially outwardly, the stem head 30 forces the deformable sleeve 32 into engagement with the tapered nose 26 and over the fastener body. Although the sleeve is shown as being a separate element, it may be formed as an integral part of the fastener body. After the stem has been moved axially a certain distance, the sleeve will be fully set against the inner surface 18 of the inner panel 14 forming a secure connection between the two workpieces. If desired, a localized weakened region or break-groove 34 may be provided at a axial location along the stem and adapted to shear the stem at a point substantially flush with the fastener body head 28, after the fastener is fully set. In most cases, the stem will twist off within a range of approximately one-eighth of an inch above or below the outer surface of the fastener body head.

Turning of the stem 24 relative to the fastener body 20 to set the fastener 10 is accomplished preferably by applying a torque to the stem while holding the fastener body against rotational movement. Various conventional power driven installation tools having wrench bits may be used for setting and installing the fastener in the manner described above.

To enable turning of the stem 24, the outer end of the stem is provided with a pair of wrenching flats 36 adapted to engage the rotary wrench bit of the installation tool (not shown). Wrench engaging means other than flats 36 may be provided on the stem, as desired. To prevent turning of the fastener body 20 within the panels 12 and 14 while the stem is being turned, a drive nut 38 is mounted on the stem in abutment with the fastener body head 28. The drive nut has an outer surface 40 for engagement by a non-rotating fitting on the installation tool (not shown) and an inner surface 42 that is threaded for engagement with the externally threaded stem 24. In most tools, the non-rotating fitting is concentric with but axially spaced from the rotating wrench bit and holds the drive nut and thus the fastener body against rotation relative to the stem.

In accordance with the present invention, deformable means are provided to create a positive mechanical engagement between the contacting surfaces of the drive nut 38 and the fastener body head 28. In one embodiment of the invention, illustrated in FIGS. 1-4, the deformable means comprises a plurality of indentations 44 on the outer surface of the fastener body head, and a generally annular ridge 46 on the underside of the drive nut. More particularly, referring to the drive nut illustrated in FIG. 4, a first counterbore 48 is provided on the underside of the drive nut concentric with the internally threaded portion 42 of the drive nut engaging the stem 24. A second, larger diameter counterbore 50 is formed concentric with the first counterbore 48, but extending only a relatively short distance into the first counterbore. The remaining outer portion 52 of the underside of the drive nut is conically shaped or tapered radially outwardly from the second counterbore by, for example, machining, to form the annular ridge 46, which is relatively sharp or pointed. The annular ridge is adapted to deform into the indentations 44 in the outer surface of the fastener body head 28 to create a positive mechanical engagement and minimize overtightening and jamming between the drive nut and the fastener body head. The first counterbore 48 also provides a sufficient clearance between the stem's external threads and the drive nut's internal threads to prevent the drive nut from remaining attached to the stem in the event of a high stem break-off.

Figure 2:
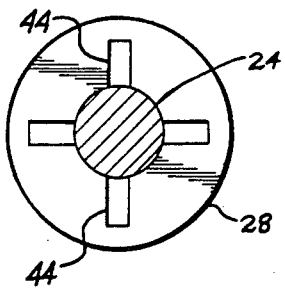
FIG. 2 is cross-sectional view of the fastener, taken substantially along the line 2—2 of FIG. 1, showing recesses in the outer surface of the fastener body.
Figure 3:
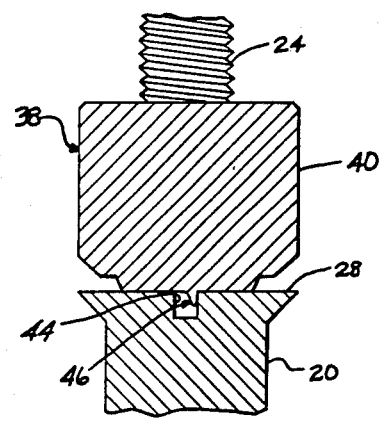
FIG. 3 is a cross-sectional view of the fastener, taken substantially along line 3—3 of FIG. 1, with the fastener in a set condition.
Figure 4:
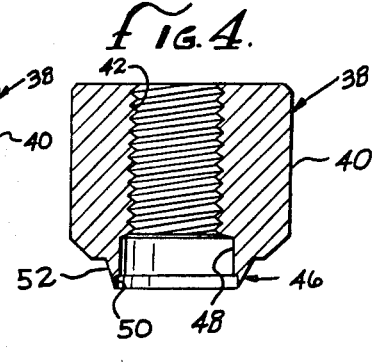
FIG. 4 is a cross-sectional view of the drive nut of FIG. 1, illustrating one embodiment of the drive nut made in accordance with the teachings of this invention.

As illustrated best in FIG. 2, the plurality of indentations 44 are formed in the outer surface of the fastener body head 28. In the preferred embodiment, there are four indentations in a configuration resembling Phillips-type notches or a cruciform recess. It is understood, however, that the indentations need not be of any particular number, size, shape or geometric configuration. For example, a single indentation is sufficent. Furthermore, the indentations may comprise a company identifying mark or insignia, or a product identification or serial number. As shown in FIG. 3, the annular ridge 46 deforms into the indentations upon rotation of the stem 24 to create a positive mechanical engagement and resistance to overtightening and jamming between the drive nut 38 and the fastener body 20. This process of deformation is explained in more detail below.

As an alternative to the indentations 44, the outer surface of the fastener body head may comprise a raised surface in the form of spaced protrusions (not shown). For example, a number of radially oriented, relatively straight ridges could be employed. Regardless of whether indentations or protrusions are used, however, it is understood that an irregular surface is required on the outer surface of the fastener body head 28. This irregular surface may take the form of indentations or protrusions as described above. That is, a raised or depressed surface in the outer surface of the fastener body head is sufficient.

To install the fastener 10 of the present invention, the fastener is inserted into the aligned openings 22 in the two panels 12 and 14 until the fastener body head 28 is received against the outer surface 16 of the outer panel. The installation tool is moved axially onto the fastener, with the non-rotating fitting engaging the drive nut 38 and holding it and thus the fastener body 20 against rotation, and with the rotary wrench bit engaging the wrenching flats 36 and turning the stem 24 in one direction to set the fastener. As the stem is rotated, the deformable annular ridge 46 on the underside of the drive nut is urged against the outer surface of the fastener body head 28, causing the ridge to deform into the indentations 44 (FIG. 3). As turning of the stem continues, deformation of the annular ridge into the indentations increases. That is, upon initial rotation of whether the stem, deformation of the annular ridge into the indentations is at its least. Further turning of the stem causes increased deformation of the annular ridge into the indentations until a positive mechanical engagement exists between the drive nut and the fastener body head. This positive mechanical engagement between the drive nut and fastener body head is best shown in FIG. 3, illustrating a portion of the annular ridge fully deformed into one of the indentations after the fastener has been set, but prior to twisting off of the outer portion of the stem at the breakgroove 34.

The positive mechanical engagement between the drive nut 38 and the fastener body head 28 described above helps to minimize overtightening and jamming of the drive nut against the fastener body head. This has the effect of preventing the build-up of unacceptably high tensile load acting on the stem 24 in the region gripped between the drive nut and the fastener body head. After the fastener 10 is fully set, further rotation of the stem relative to the drive nut causes the stem to twist off at the breakgroove 34. Importantly, the stem is not subjected to unacceptable tensile loads that could cause it to twist off prematurely before the fastener is fully set. Thus, better clamp-up of the fastener is achieved.

When the outer portion of the stem 24 twists off at the breakgroove 34, the entire drive nut 38 remains attached. As explained previously, the counterbore 48 prevents the drive nut from remaining attached to the set fastener in the event of a high stem break-off. Magnetic retrieval of the twisted off stem and attached drive nut by known techniques is thus made possible.

If desired, the manufacturer or assembler of the fastener 10 (or even the end user) may pre-deform the annular ridge 46 into the indentations 44 prior to installing the fastener in the panels 12 and 14. This can be accomplished during assembly of the fastener. During assembly, for example, the deformable sleeve 32 is placed on the stem 24 against the stem head 30, and the fastener body 20 is then threaded onto the stem until it is adjacent to the sleeve. Next, the drive nut 38 is threaded onto the stem 24 until the annular ridge 46 is in abutting contact with the fastener body head 28. Application of torque to the drive nut while holding the stem and fastener body against rotation deforms the annular ridge into the indentations to create the positive mechanical engagement described above.

Figure 6:
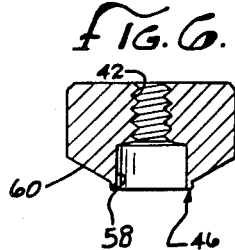
FIG. 6 is a cross-sectional view of a further embodiment of a drive nut made in accordance with the teachings of this invention
Figure 5:
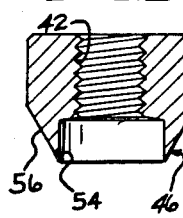
FIG. 5 is a cross-sectional view of another embodiment of a drive nut made in accordance with the teachings of this invention.

Alternate embodiments of the drive nut 38 made in accordance with the teachings of this invention are shown in FIGS. 5-6. Referring first to FIG. 5, the underside of the drive nut is provided with a single counterbore 54 substantially concentric with the internally threaded bore 42 of the drive nut. The remaining outer portion 56 of the underside of the drive nut is conically shaped or tapered from the counterbore in a radially outward manner to provide the annular ridge 46, which is relating sharp or pointed, for engaging the indentations 44 in the outer surface of the fastener body head 28. The cross-sectional configuration of the drive nut has a geometric configuration generally resembling a hollow frustum, with the cross-sectional configuration of the annular ridge having a substantially triangular appearance.

In FIG. 6, a third alternative embodiment of the drive nut 38 made in accordance with the teachings of this invention is shown. Similar to the drive nut embodiment of FIG. 5, a single counterbore 58 is provided in the underside of the drive nut substantially concentric with the internally threaded bore 42 of the drive nut. The remaining outer portion 60 of the underside of the drive nut is tapered radially inwardly from the outer periphery of the drive nut toward the counterbore and terminates in the annular ridge 46 surrounding the counterbore. This annular ridge is relatively thin in cross-section and, in this preferred embodiment, is substantially square in cross-section. It is understood that a similar, non-triangular geometric shape also could be used.

Regardless of which embodiment of the drive nut 38 is selected, all embodiments function in substantially the same manner and deform into or around an irregular surface, either raised or depressed, on the outer surface of the fastener body head 28.

The deformable annular ridge 46 of the drive nut 38 can be constructed from any deformable material that forms or flows when compression forces are applied. Such materials include metallic and non-metallic materials. For example, various types of stainless steel or steel alloys form or flow when compression forces are applied. Other representative materials include titanium and aluminum. The remaining components of the fastener 10, including the fastener body 20, stem 24 and sleeve 32 also may be constructed from various types of stainless steel, steel alloys, titanium and aluminum. For example, the fastener body, stem and sleeve may be constructed from stainless steel, and the drive nut may be constructed from carbon steel.

While the deformable annular ridge 46 is described and illustrated as being integrally formed with the drive nut 38, it is understood that the ridge can be a separate component attached to the underside of the drive nut. For example, a non-metallic material such as a neoprene O-ring or the like (not shown) may be bonded to the underside of the drive nut for elastically deforming into or around an irregular surface on the fastener body head 28. It also is understood that the deformable annular ridge need not be a part of the drive nut. Instead, the ridge may be a part of the outer surface of the fastener body head, and the irregular surface may be provided on the underside of the drive nut. It also is understood that the fastener 10 of this invention need not be a blind fastener, and that the teachings of this invention apply to other types of fasteners in which a drive nut is used.

The method of fastening the panels 12 and 14 using the fastener 10 of this invention comprises the steps of inserting the fastener through the aligned openings 22 in the panels until the fastener body head 28 engages the outer surface 16 of the outer panel 12, with the sleeve 32 positioned beyond the inner surface 18 of the inner panel 14. The installation tool is applied to grip the drive nut 38 and hold it against rotation, while applying torque to the outer region of the stem 24 to turn it in one direction until the sleeve has been bulged laterally to a fully set condition in overlying contact with the inner surface of the inner panel. The method further includes deforming the deformable annular ridge 46 on the underside of the drive nut into the indentations 44 on the outer surface of the fastener body head to provide the positive mechanical engagement between the drive nut and the fastener body head during turning motion of the stem to set the fastener. As described previously, the annular ridge may be pre-deformed into the indentations prior to inserting the fastener into the panels.

It will be appreciated from the foregoing that the present invention provides a blind fastener 10 having deformable means for providing a positive mechanical engagement between the drive nut 38 and the fastener body head 28. During setting of the fastener, a deformable annular ridge 46 deforms into indentations 44 in the outer surface of the fastener body head to minimize overtightening and jamming and, thus, prevent the build-up of unacceptably high tensile load in the stem 24. This in turn helps prevent pre-mature stem break-off before the fastener is fully set.

While a particular form of the invention has been illustrated and described, it will be apparent that various modifications can be made without departing from the spirit and scope of the invention. Accordingly, it is not intended that the invention be limited, except as by the appended claims.

I claim:

1. A fastener for mounting in aligned openings through two panels to connect them together in overlapped outer and inner relation and adapted to be set by wrench means, the fastener comprising:
    a generally tubular fastener body received within the openings in the panels, said fastener body having
        an inner end projecting inwardly beyond the inner panel, and
        an enlarged body head for engagement with the outer surface of the outer panel, the outer surface of said body head having an irregular surface;
    an externally threaded cylindrical stem passing through said fastener body, said stem having
        an enlarged stem head spaced from the inner end of said fastener body, and
        a wrench engaging region spaced from the outer end of said fastener body; and
    an internally threaded drive nut threadedly mounted on said stem, the underside of said drive nut in abutment with said irregular surface of said body head having a deformable surface, said drive nut and said wrench engaging region being engaged by the wrench means to cause turning of said stem in one direction relative to said drive nut to set said fastener, said deformable surface of said drive nut being adapted to deform against said irregular surface of said body head upon turning motion of said stem causing a positive mechanical engagement between said drive nut and said body head.

2. A fastener for mounting in aligned openings through two panels to connect them together in overlapped outer and inner relation and adapted to be set by wrench means, the fastener comprising:
    an internally threaded, generally tubular fastener body received within the openings in the panels, said fastener body having,
        an inner end projecting inwardly beyond the inner panel, and
        an enlarged body head for engagement with the outer surface of the outer panel;
    an externally threaded cylindrical stem passing in threaded engagement through said fastener body, turning motion of said stem relative to said fastener body in one direction moving said stem in an axially outward direction through said fastener body, said stem having
        an enlarged stem head spaced from the inner end of said fastener body, and
        a wrench engaging region spaced from the outer end of said fastener body;
    a deformable sleeve around said stem in contact with said stem head, movement of said stem outwardly through said fastener body deforming said sleeve to a fully set condition in overlying contact with the inner surface of the inner panel;
    an internally threaded drive nut threadedly mounted on said stem in abutment with the outer surface of said body head, said drive nut and said wrench engaging region being engaged by the wrench means to cause turning of the stem in the one direction relative to said drive nut, said drive nut restraining said fastener body from turning in the panels during turning of said stem; and deformable means for providing a positive mechanical engagement between said drive nut and said body head in a tightening direction during turning motion of said stem, said deformable means having an irregular surface on the outer surface of said body head, and a deformable surface on the underside of said drive nut, said deformable surface being adapted to deform against said irregular surface to provide a positive mechanical engagement between said drive nut and said body head.

3. A fastener as defined in claim 2, wherein said deformable surface on the underside of said drive nut comprises a relatively thin, deformable annular ridge, and said irregular surface on the outer surface of said fastener body head comprises at least one indentation.

4. A fastener as defined in claim 3, wherein there are a plurality of indentations on the outer surface of said fastener body head.

5. A fastener as defined in claim 2, wherein said deformable surface is integral with said drive nut.

6. A fastener as defined in claim 2, wherein said deformable surface is attached to said drive nut.

* * * * *